Feb. 21, 1928. 1,659,753

A. R. THOMPSON

FLUID POWER TRANSMITTING MECHANISM

Filed Aug. 7, 1926 3 Sheets-Sheet 1

INVENTOR
Albert R. Thompson
BY Booth and Booth
ATTORNEYS

Feb. 21, 1928.

A. R. THOMPSON 1,659,753

FLUID POWER TRANSMITTING MECHANISM

Filed Aug. 7, 1926   3 Sheets-Sheet 2

INVENTOR
Albert R. Thompson
BY Booth and Booth
ATTORNEYS.

Feb. 21, 1928.

A. R. THOMPSON 1,659,753

FLUID POWER TRANSMITTING MECHANISM

Filed Aug. 7, 1926  3 Sheets-Sheet 3

INVENTOR
Albert R. Thompson
BY Booth and Booth
ATTORNEYS.

Patented Feb. 21, 1928.

1,659,753

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

FLUID POWER-TRANSMITTING MECHANISM.

Application filed August 7, 1926. Serial No. 127,849.

My invention relates to fluid power-transmitting mechanisms of the type in which a fluid pump and a fluid motor are connected in a closed circuit.

The object of the invention is to provide means for varying the speed ratio between the driving and the driven members, without any loss of power or mechanical efficiency. This object is accomplished by varying the effective displacement of the pump pistons, thereby varying the flow, and inversely the pressure, of the fluid delivered thereby.

A preferred embodiment of the invention comprises a rotary pump having one or more radially movable vanes running in an eccentric cylinder, and a fluid motor of the same general type, the two being connected by suitable conduits. No valves or by-passes are needed, the speed-ratio control being effected entirely by varying the effective area of the vanes of the pump. Thus, assuming the speed of the pump to be constant, the smaller is such effective area, the smaller will be the flow, and the higher the pressure of the fluid, and consequently the lower will be the speed of the driven member or fluid motor, and the greater its torque.

My invention is particularly well suited for use in engine driven vehicles, altho it is not limited thereto. In such use, it takes the place of the usual variable-speed gearing between the engine and the wheels, and provides an unlimited speed-ratio variation, so that the most efficient engine speed may be maintained at all times. When so used, it will be obvious that a plurality of fluid motors or driven members may be employed, one at each wheel of the vehicle, for example, and all connected by suitable conduits with a single pump driven by the vehicle engine. Such an arrangement would eliminate the so-called differential gear commonly employed in vehicle driving axles.

For the sake of simplicity in the drawings, I have illustrated only a single fluid motor, connected in a closed fluid circuit with a variable flow pump. It is to be understood, however, that the arrangement, form, and construction of the several parts and members of the mechanism may be changed, within the limits of the claims hereto appended, without departing from the spirit of the invention as set forth in said claims.

With this in view, a preferred embodiment of my invention will now be described fully with reference to the accompanying drawings, wherein:—

Figure 2:
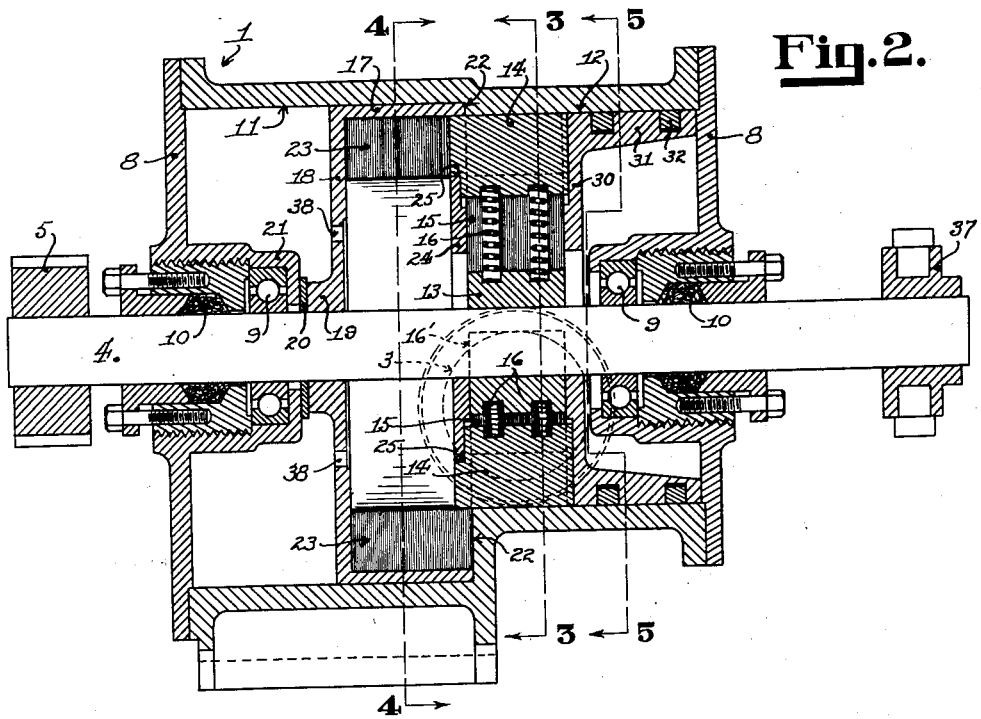
Fig. 2 is a central longitudinal section of the pump shown in Fig. 1, and is taken on the line 2—2 of Fig. 3.
Figure 3:
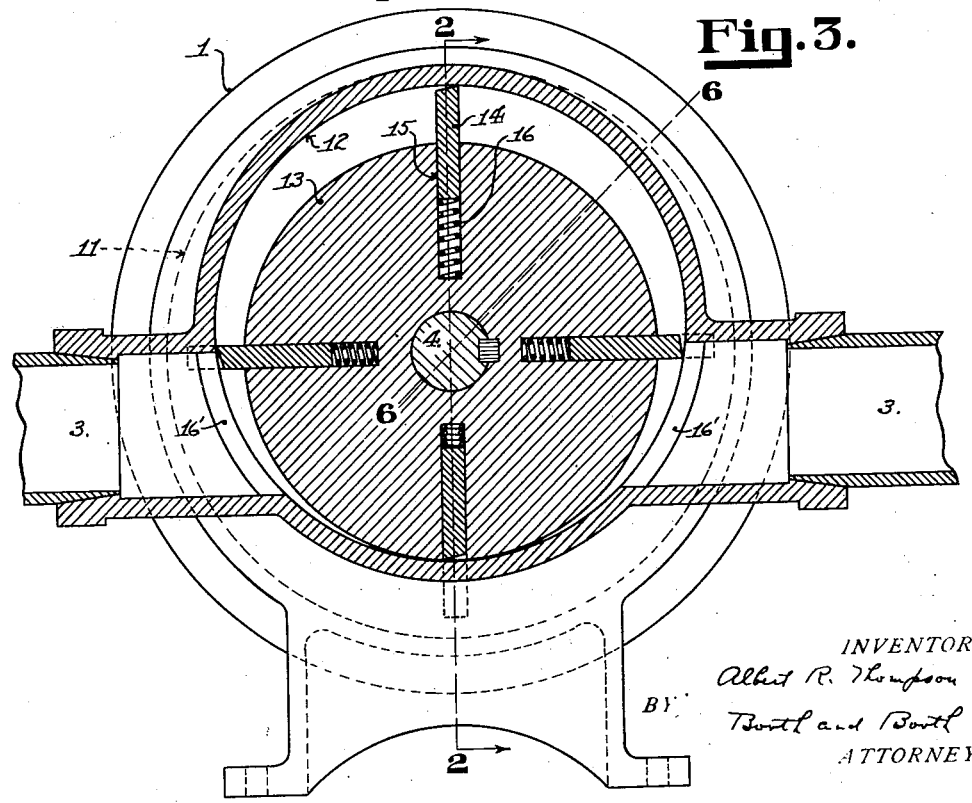
Figure 4:
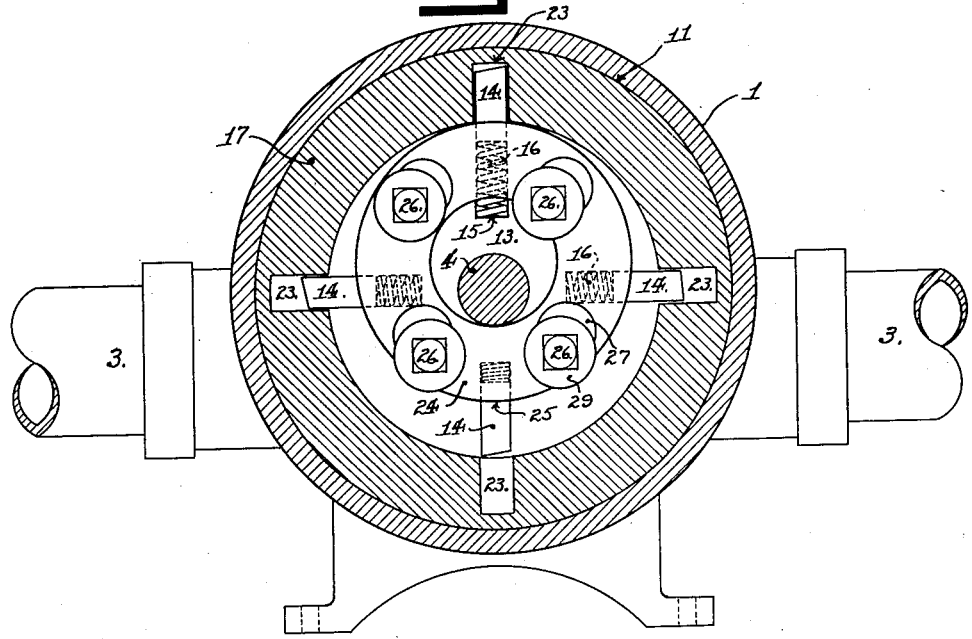
Figure 5:
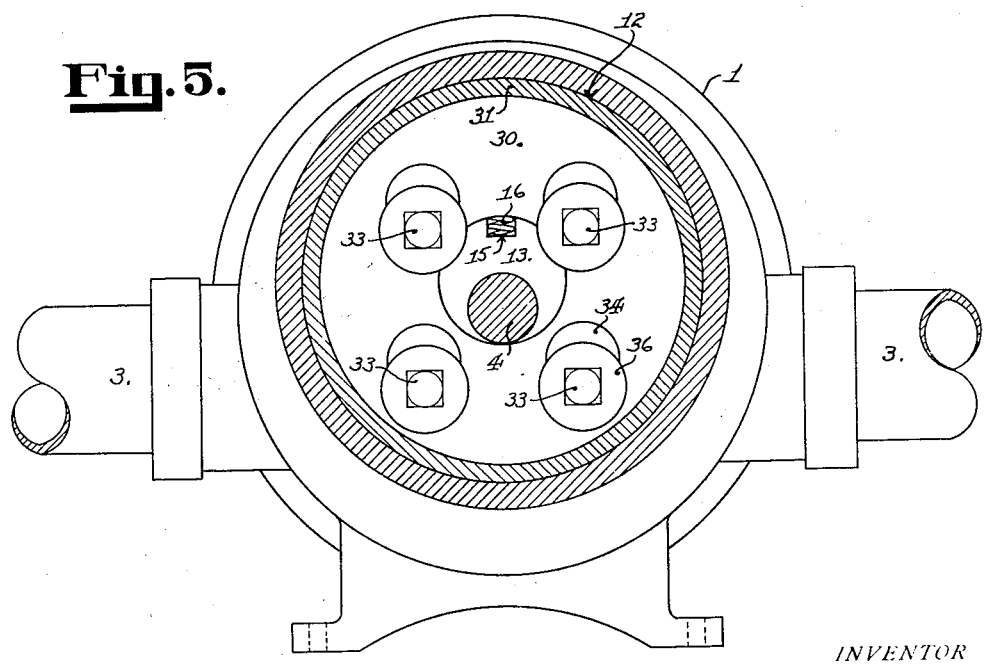

Figs. 3, 4 and 5 are transverse sections of the pump taken respectively on the lines 3—3, 4—4, and 5—5, of Fig. 2 and viewed in the direction of the respective arrows in each case.

Figure 6:
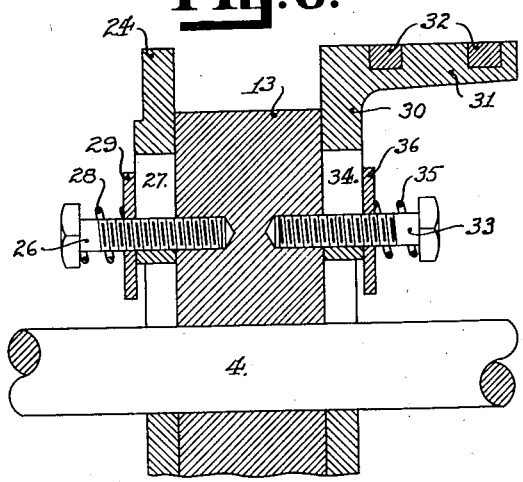

Fig. 6 is a sectional detail taken on the line 6—6 of Fig. 3.

Figure 1:
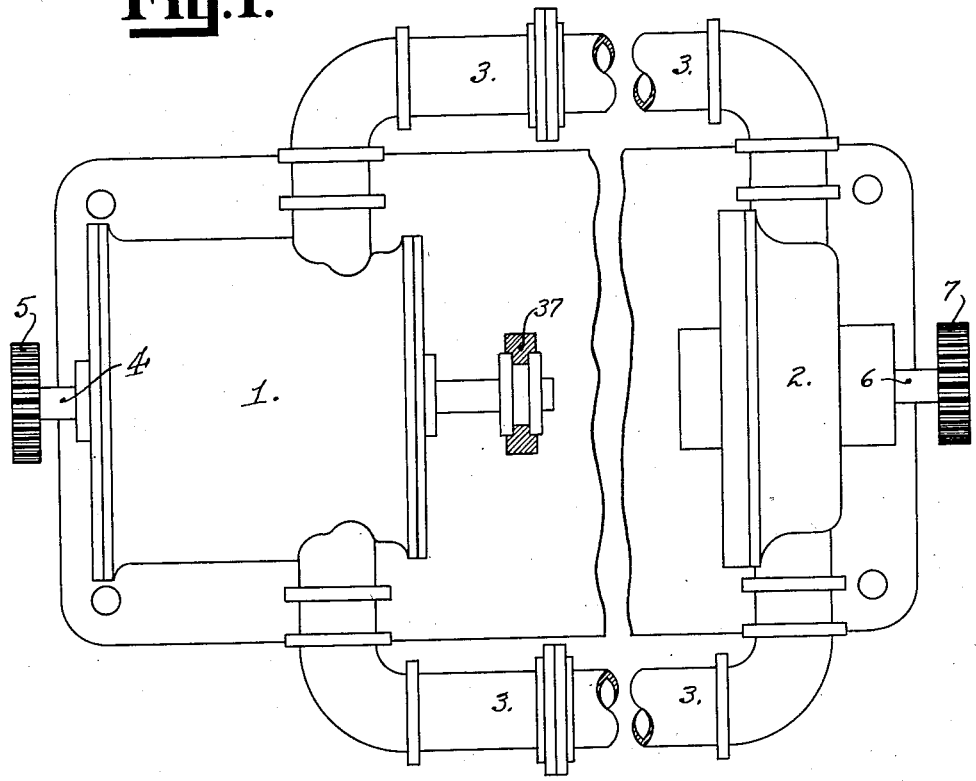
Fig. 1 is a plan view, partly diagrammatic, of a complete power-transmitting mechanism.

In the drawings, and referring for the moment to Fig. 1 thereof, the reference numeral 1 designates, generally, the pump or driving member of my power-transmitting mechanism, and 2 is the fluid motor or driven member thereof. Both are shown as of the rotary type, and are connected preferably in a closed circuit, by suitable conduits 3, the fluid flowing from the pump 1 to the motor 2, at relatively high pressure, through one of said conduits, and returning from the motor to the pump at relatively low pressure, through the other. The pump 1 has a rotatable shaft 4, which may be considered as the driving shaft of the mechanism, and which is provided with suitable means, as for example a gear 5, by which it may be driven from an outside source of power, not shown. Similarly, the motor 2 has a rotatable shaft 6, constituting the driven shaft of the mechanism, which is provided with suitable connecting means, indicated as a gear 7. Obviously, the pump 1 and the motor 2 may be placed in any desired relative positions, by suitable extension of the conduits 3.

The construction of the pump 1 is shown in detail in Figs. 2 to 6. The housing or shell of said pump has opposite end plates 8, Fig. 2, in which the shaft 4 is mounted, with suitable bearings and packing indicated at 9 and 10 respectively. Between these end plates the body of the shell is formed in two preferably integral cylindrical portions 11 and 12. The portion 11 is concentric with the shaft 4, as shown in Fig. 4, whereas the portion 12, which constitutes the cylinder of the pump, is eccentric and of smaller diameter than the portion 11, as shown in Figs. 3 and 5.

The rotor of the pump comprises a body 13 secured upon the shaft 4, and radially movable vane pistons 14 carried in slots 15 therein. Springs 16 press the vanes outwardly into contact with the wall of the cylinder 12. Any suitable number of vanes may be employed, four being shown in the drawings. Inlet and outlet apertures 16', Figs. 2 and 3, connect the conduits 3 with the cylinder, so that the vanes or pistons 14, traveling in the eccentric cylinder 12, draw the fluid in through one of said apertures and force it out through the other, after the well-known manner of a vane pump.

To control the output of the pump, and thereby to vary the flow, and inversely the pressure, of the delivered fluid, I provide means for varying the effective length of the cylinder 12, thereby varying the effective area of the vane pistons 14 and the fluid displacement thereof. For this purpose there is provided a ring 17, Figs. 2 and 4, rotatable in the shell portion 11 concentric with the shaft 4. A web 18 extends inwardly from said ring to a hub 19 freely surrounding the shaft 4. The ring 17 is prevented from moving endwise in one direction by an end thrust bearing at 20 between its hub 19 and the shaft bearing housing 21, and in the other direction by its contact with the shoulder 22 separating the shell portions 11 and 12.

The ring 17 forms one end wall of the cylinder 12, and is provided with radially disposed slots 23 into which the edges of the vanes 14 extend, when the parts are in the positions shown in Fig. 2. The rotor, and the shaft 4 upon which it is mounted, are movable endwise, toward the left from the position shown in Fig. 2, and in such endwise movement the vanes 14 slide or recede into the slots 23 of the ring 17. The ring thus rotates at all times with the rotor, but does not move endwise therewith, the rotor sliding within the ring in such movement.

An annular plate 24, Figs. 2, and 4, lies against the left hand end of the rotor body 13, and has its outer periphery bearing against shoulders 25 formed in the edges of the vanes 14. This plate not only holds the vanes in place endwise, but also acts as a spacer between the oppositely disposed vanes, to keep them in contact with the peripheral wall of the cylinder 12. It must, therefore, run eccentrically about the shaft 4. To secure the plate 24 to the end of the rotor, while permitting its eccentric movement, I provide a suitable number of studs 26, Figs. 4 and 6, extending from the rotor body and passing through suitably enlarged apertures 27 in the plate 24. Springs 28 and washers 29 hold said plate firmly against the end of the rotor, and yet allow it to slip thereupon in following its eccentric path. The studs 26 have been omitted from Fig. 2 to avoid confusion.

The opposite, or right hand end wall (as viewed in Fig. 2) of the cylinder 12 is movable endwise with the rotor. It comprises a ring or plate 30, having a cylindrical flange 31. The latter fits closely and rotates within the cylinder 12, and is provided with suitable packing rings 32. Because said flange runs in the eccentric cylinder, the plate 30 is associated with the end of the rotor in a manner similar to that described above in connection with the plate 24, viz:— by studs 33, Figs. 5 and 6, projecting from the end of the rotor body and passing through suitably enlarged apertures 34 in said plate 30, and provided with springs 35 and washers 36, as shown. The plate 30 thus rotates eccentrically about the shaft 4, but follows the said shaft and the rotor in their endwise movement. Fitting closely within the cylinder 12, and against the ends of the vanes 14, it forms a fluid tight end wall for said cylinder.

It will thus be seen that the left hand end wall of the cylinder, formed by the ring 17, is not movable endwise, whereas the right hand end wall, formed by the plate 30, is movable toward and away from said left hand end wall, to decrease or increase the length of the cylinder, and thereby decrease or increase the effective area and consequently the displacement of the vane pistons 14. It should be remembered that said pistons, in moving endwise, recede into and extend out of the slots 23 in the ring 17. The shaft 4 is slidable endwise through its bearings 9, and through the hub 19 of the ring 17, to effect the increase or decrease in the length of the cylinder, and is provided with any suitable means, as for example a thrust collar 37, by which such movement may be produced while the shaft is rotating.

It is intended that the entire space within the shell of the pump 1 shall be filled with the operating fluid, to minimize leakage from the cylinder 12. The web 18 of the ring 17 is apertured, as shown at 38, to permit the fluid to occupy all the available space. When the rotor is shifted endwise, the non-circulating portion of the fluid passes freely through the bottom portions of the vane slots 15 from one end to the other of said rotor.

The operation of the mechanism will be apparent from the foregoing description of its construction. Assuming the pump 1 to be driven at a constant speed for example, the speed of the motor 2 will depend upon the rate of flow of the fluid, and this in turn depends upon the displacement or effective area of the pump vanes or pistons 14.

As the pump rotor is shifted toward the left as viewed in Fig. 2, the effective area of the vanes is decreased, the fluid flow is consequently decreased, and the motor will operate more slowly. But this decreased effective area of the pump vanes 14 also raises the pressure of the fluid, so that the motor is capable of exerting a correspondingly greater torque. It is to be noted that there is no by-passing or throttling of the fluid, with consequent loss of power.

I claim:—

1. In a fluid power-transmitting mechanism, a pump comprising a cylinder; an annular member having a slot extending outwardly from its inner periphery and terminating short of its outer periphery, said member being rotatably mounted within said cylinder; a rotor mounted within said cylinder and movable endwise into and out of said annular member; and a fluid impelling vane carried by said rotor and adapted to recede into and extend out of said slot to vary its effective fluid impelling area.

2. In a fluid power-transmitting mechanism, a pump comprising a rotatable shaft; a stationary shell having a cylindrical portion concentric with said shaft and a second adjacent portion eccentric with said shaft, said second portion forming the working cylinder of the pump; an annular member rotatably fitted within the concentric portion of said shell and provided with a slot extending outwardly from its inner periphery, said annular member forming one end wall of said working cylinder; a rotor carried by the shaft within the working cylinder and movable endwise into and out of said annular member; a fluid impelling vane carried by said rotor and adapted to recede into and extend out of said slot to vary its effective fluid impelling area; and an opposite end wall for said working cylinder movable endwise with said rotor.

3. In a fluid power-transmitting mechanism, a pump comprising a shell having two adjacent relatively eccentric portions; an annular member rotatable within one shell portion and provided with a slot; a rotor eccentrically mounted within the other shell portion and movable endwise into and out of said annular member; and a fluid impelling vane carried by said rotor and adapted to follow the wall of the last mentioned shell portion and to recede into said slot to vary its effective fluid-impelling area.

4. In a fluid power-transmitting mechanism, a pump comprising a shell forming a compression chamber; a rotor eccentrically mounted therein; a fluid-impelling vane carried by said rotor and adapted to follow the wall of said chamber; a rotatable member concentric with said rotor and forming an end wall for said chamber, said member having a central recess and a slot extending outwardly therefrom; and means for moving said rotor endwise into the recess of said member, said vane receding into said slot to vary its effective area.

5. In a fluid power-transmitting mechanism, a pump comprising a shell forming a compression chamber, a rotor eccentrically mounted therein; a fluid-impelling vane carried by said rotor and adapted to follow the wall of said chamber; a rotatable member concentric with said rotor and forming an end wall for said chamber, said member having a central recess and a slot extending outwardly therefrom; means for moving said rotor endwise into the recess of said member, said vane receding into said slot to vary its effective area; and an opposite end wall rotatable in said chamber and adapted to follow the endwise movement of said rotor.

6. In a fluid power-transmitting mechanism, a pump comprising a shell forming a compression chamber; a rotor eccentrically mounted therein; a fluid-impelling vane carried by said rotor and adapted to follow the wall of said chamber; a rotatable member concentric with said rotor and forming an end wall for said chamber, said member having a central recess and a slot extending outwardly therefrom; means for moving said rotor endwise into the recess of said member, said vane receding into said slot to vary its effective area; a second member rotatable in close fitting relation within said chamber and forming an opposite end wall therefor; and means for movably securing said second end member to said rotor to cause it to move endwise therewith.

In testimony whereof I have signed my name to this specification.

ALBERT R. THOMPSON.